H. F. WOERNLEY.
FRICTION DRAFT GEAR.
APPLICATION FILED NOV. 11, 1919.

1,378,393.

Patented May 17, 1921.
2 SHEETS—SHEET 1.

INVENTOR
Harry F. Woernley
BY
Wm. M. Cady
ATTORNEY

H. F. WOERNLEY.
FRICTION DRAFT GEAR.
APPLICATION FILED NOV. 11, 1919.
1,378,393.
Patented May 17, 1921.
2 SHEETS—SHEET 2.
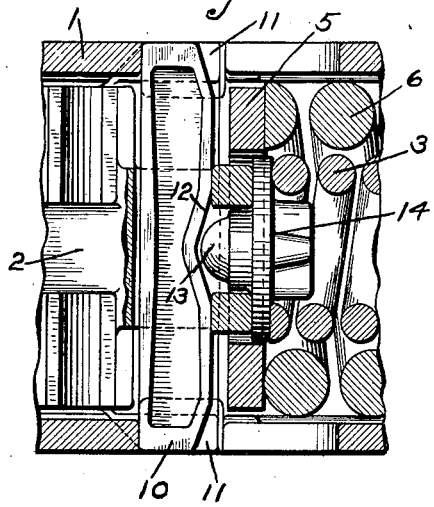
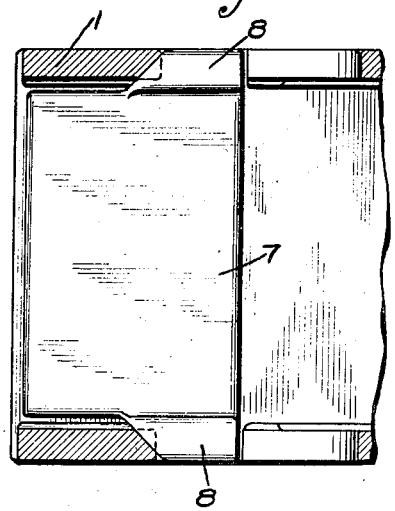
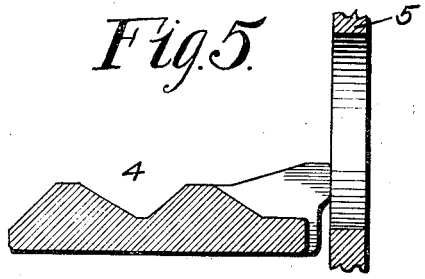
INVENTOR
Harry F. Woernley
BY
*Wm. M. Cady*
ATTORNEY

UNITED STATES PATENT OFFICE.

HARRY F. WOERNLEY, OF PITTSBURGH, PENNSYLVANIA, ASSIGNOR TO THE WESTINGHOUSE AIR BRAKE COMPANY, OF WILMERDING, PENNSYLVANIA, A CORPORATION OF PENNSYLVANIA.

FRICTION DRAFT-GEAR.

1,378,393.     Specification of Letters Patent.     Patented May 17, 1921.

Application filed November 11, 1919. Serial No. 337,360.

*To all whom it may concern:*

Be it known that I, HARRY F. WOERNLEY, a citizen of the United States, residing at Pittsburgh, in the county of Allegheny and State of Pennsylvania, have invented new and useful Improvements in Friction Draft-Gears, of which the following is a specification.

This invention relates to friction draft gears of the type shown in my prior pending application, Serial No. 49,225, filed September 7, 1915, and the principal object of my invention is to provide an improved draft gear of this type.

Figure 1:
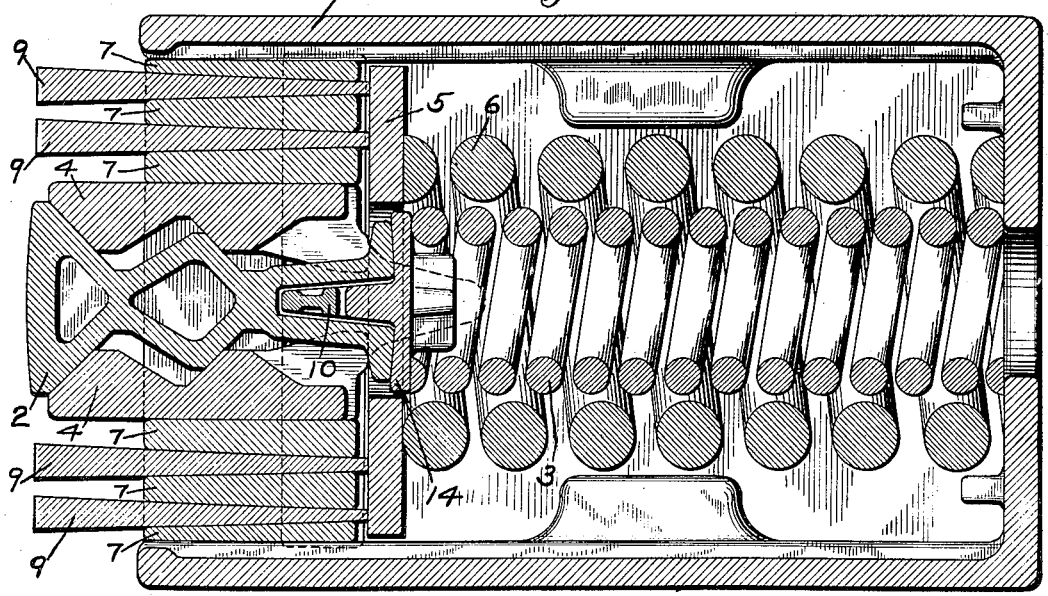
Figure 2:
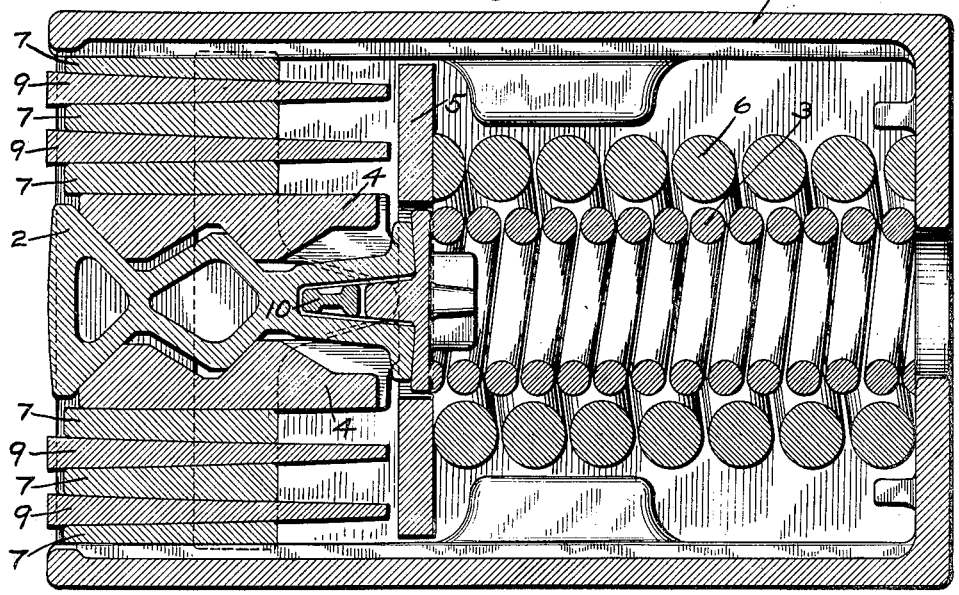

In the accompanying drawings; Figure 1 is a central horizontal section of a friction draft gear embodying my invention, and showing the parts in normal release position; Fig. 2 a similar view, showing the parts under compression; Fig. 3 a fragmentary elevational view of the draft gear, partly in section; Fig. 4 a vertical section of a portion of the casing, showing one of the stationary friction plates in position; and Fig. 5 a detail section view, showing one of the wedge blocks engaging the spring plate.

As shown in the drawings, the draft gear may comprise a casing 1 containing a central wedge member 2, the inward movement of which is opposed by a coil spring 3, and having oppositely inclined friction faces adapted to engage corresponding friction faces on wedge blocks 4.

The wedge blocks 4 bear against a spring plate 5 and inward movement thereof is yieldingly resisted by a coil spring 6.

Interposed between the wedge blocks 4 and the casing 1 are a plurality of alternately arranged stationary, and longitudinally movable friction plates.

The stationary plates 7 are prevented from moving longitudinally by means of lugs 8 adapted to engage in slots in the casing 1; while the alternate friction plates 9 are adapted to move longitudinally with respect to the casing 1.

According to the principal feature of my invention, the longitudinally movable friction plates 9 are made wedge shaped, with the oppositely inclined friction faces thereof adapted to engage corresponding friction faces of the stationary friction plates 7.

In order to hold the parts in position when the gear is not in its applied position on the car, a key 10 is provided, which passes through a recess in the central wedge member 2 and engages the walls of the transverse slots 11 formed in the casing 1.

In order to insure against the key dropping out, the same is provided with a central depression 12, within which a projecting portion 13 of the spring plate 14 is adapted to engage when the key is in position.

When the key is driven into place, the spring plate 14 is pressed away against the resistance of spring 3 until the key has been driven to its final position, where the projection 13 rests in the depression 12 and prevents any substantial vertical movement of the key, as will be evident.

In operation, under either a buffing or a draft stress, the central wedge member 2 is first moved against the resistance of spring 3 and the wedge blocks 4 are caused to exert a pressure on the friction plates 7 and 9. The movable plates 9 are then engaged by the usual follower plate (not shown) and are moved with the central wedge member 2.

Since the plates 9 are made in the form of wedges, it will be seen that as the plates move, a wedging action is produced, so as to insure that the frictional resistance of the parts to longitudinal movement, will be fully maintained, throughout the movement of the parts.

Excessive lateral pressure is prevented by the action of the wedge blocks 4, which are adapted to move ahead of the plates 9, when the pressure becomes excessive, compressing the spring 6, the wedge blocks 4 engaging the spring plate 5, as shown more clearly in Fig. 5 of the drawings.

In release, the pressure of the compressed spring 3 operates to effect the release of the central wedge member 2, while the pressure of the spring 6 acts, through the spring plate 5, against the plates 9, to remove same back to normal position.

It will be noted that in the release movement, since the plates 9 are wedge shaped, the lateral pressure will be promptly relieved, as soon as the plates start to move toward normal release position.

Having now described my invention, what I claim as new, and desire to secure by Letters Patent, is:—

1. In a friction draft gear, the combination with one group of wedge shaped friction plates and another group of alternated wedge shaped friction plates having relative longitudinal movement parallel with the line of draft, of wedging means for impressing a lateral pressure on said friction plates.

2. In a friction draft gear, the combination with a plurality of relatively stationary friction plates and a plurality of alternate friction plates having relative longitudinal movement parallel with the line of draft, the relatively movable friction plates having the friction faces thereof oppositely inclined to the line of draft, of means for impressing a lateral wedging action on said friction plates.

3. In a friction draft gear, the combination with a plurality of relatively stationary friction plates and a plurality of alternate friction plates having relative longitudinal movement parallel with the line of draft, the relatively movable friction plates having friction faces oppositely inclined to the line of draft and the relatively stationary plates having coöperating friction faces oppositely inclined to the line of draft.

4. In a friction draft gear, the combination with friction members, of a key for holding said members in position and having a central depression, a spring plate having a projecting portion for engaging in said depression, and a spring pressing against said spring plate.

In testimony whereof I have hereunto set my hand.

HARRY F. WOERNLEY.